UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT AND VARNISH REMOVER.

1,095,270.   Specification of Letters Patent.   Patented May 5, 1914.

No Drawing. Original application filed February 26, 1907, Serial No. 359,509. Divided and this application filed August 6, 1907. Serial No. 387,271.

*To all whom it may concern:*

Be it known that I, CARLETON ELLIS, a citizen of the United States, and a resident of Larchmont, Westchester county, State of New York, have invented a new and useful Improvement in Paint and Varnish Removers, of which the following is a specification, this being a divisional application of my application Serial No. 359,509, filed February 26, 1907.

My invention relates to paint and varnish removers of an acid character and especially to those containing a volatile instead of a non-volatile acid so that when the coating of paint or varnish has been removed any acid remaining on the treated surface may quickly evaporate and leave the same in a fit condition for the application of a new finish coating.

My invention is designed to provide an especially efficient remover for coatings containing readily decomposable paint pigments, such as the carbonates, among which white lead is the most noteworthy example. When my remover is applied to such coatings the pigments are immediately attacked by the acid and rapidly disintegrated under the influence of the chemical action. In the case of carbonates this action is especially effective owing to the simultaneous mechanical disintegration of the paint or varnish coating due to the evolution and escape of carbon dioxid. The evolution of gas also increases the efficiency of the neutral volatile solvents present to a marked degree as the latter are subjected to a continual agitation thereby, resulting in submitting the surface under treatment to all parts of the body of solvents alike.

For the purposes of this invention I prefer to use formic acid. This may be mixed with benzol or one or more substances allied thereto in their solvent properties such as the benzol homologues, including toluol, xylol and cumene; the petroleum hydrocarbons, such as benzin and kerosene; the chlorinated hydrocarbons, such as carbon tetrachlorid and chlorbenzol; the simple ethers such as methyl, ethyl and amyl ethers, and compound ethers such as methyl, ethyl and amyl acetates; and carbon disulfid. Ethyl alcohol or one or more substances having similar solvent properties may also be added, such as methyl, amyl and denatured alcohols; the ketones, as acetone, methyl acetone, methyl ethyl ketone, acetone oil, butyrone and pinacolin; and light oil of hard wood tar. I preferably add a thickener of some kind to this mixture to retard the evaporation of the solvents, although I do not consider this essential. Among such substances that are useful in this connection may be mentioned wood flour, starch, whiting, infusorial earth, the soaps, the waxes and nitrocellulose. These thickeners when added are incorporated during agitation so as to secure as homogeneous a mixture as possible. Those thickeners which are soluble in one or more of the solvents are first incorporated in the solvents which dissolve them most readily.

My preferred composition comprises among other ingredients:

| | |
|---|---|
| Amyl alcohol | 15 parts. |
| Light kerosene | 10 parts. |
| Pinacolin | 20 parts. |
| Formic acid | 5 parts. |

Other solvents from the preceding lists might, of course, be added or substituted, such for instance as suitable proportions of one or more of the chlorinated hydrocarbons, ethers, esters and tar oils referred to as well as several per cent. of waxy or other thickening material. In some of these mixtures reaction probably takes place between the formic acid and one or more of the other ingredients, though exactly what the reaction may be in each case is not certain. Thickening material may be added if desired.

A composition of this character is especially useful in "dipping," that is to say where a quantity of the remover is placed in a tank and the painted article, from which the coating is to be removed, is lowered into the body of the liquid. The remover may also, however, be used in the ordinary way by applying a superficial coating of it to the painted surface. In this case it is desirable to incorporate a thickener.

What I claim and wish to cover by Letters Patent is:

1. The finish remover comprising approximately fifteen parts of amyl alcohol, ten parts of light kerosene, twenty parts of pinacolin, five parts of formic acid and incorporated thickening material.

2. The finish remover comprising approximately alcoholic solvent material, fifteen parts, light hydrocarbons ten parts, pinacolin twenty parts, formic acid five parts, and incorporated thickening material.

3. The finish remover comprising approximately alcoholic solvent material fifteen parts, light oily hydrocarbons ten parts, ketonic material comprising pinacolin twenty parts, formic acid five parts, and incorporated thickening material.

4. The finish remover consisting in large proportion of alcoholic and ketonic solvent material comprising pinacolin, with which is incorporated miscible hydrocarbons, formic acid and thickening material.

5. The finish remover comprising approximately fifteen parts of amyl alcohol, ten parts of light kerosene, twenty parts of pinacolin, and five parts of formic acid.

6. The finish remover comprising approximately alcoholic solvent material, fifteen parts, light hydrocarbons ten parts, pinacolin twenty parts, and formic acid five parts.

7. The finish remover comprising approximately alcoholic solvent material fifteen parts, light oily hydrocarbons ten parts, ketonic material comprising pinacolin twenty parts and formic acid five parts.

In testimony whereof I have hereunto signed my name in the presence of two witnesses.

CARLETON ELLIS.

Witnesses:
SAMUEL R. BELL,
HARRY W. BROWN.